United States Patent [19]

Mott

[11] 4,088,576

[45] May 9, 1978

[54] METHOD OF MANUFACTURE OF TUBULAR INERTIAL FILTER

[76] Inventor: Lambert H. Mott, c/o Mott Metallurgical Corporation, Farmington Industrial Park, Farmington, Conn. 06032

[21] Appl. No.: 749,874

[22] Filed: Dec. 13, 1976

[51] Int. Cl.² .................................... B01D 35/18
[52] U.S. Cl. .................................... 210/66; 210/71; 210/75; 210/510
[58] Field of Search .............. 210/66, 68, 75, 510, 210/67, 71, 76

[56] References Cited

U.S. PATENT DOCUMENTS

| | | | |
|---|---|---|---|
| 2,457,051 | 12/1948 | Le Clair | 210/510 |
| 2,979,400 | 4/1961 | Mouwen | 210/510 |
| 3,241,681 | 3/1966 | Pall | 210/510 |

Primary Examiner—Charles N. Hart
Assistant Examiner—Ivars Cintins
Attorney, Agent, or Firm—Prutzman, Hayes, Kalb & Chilton

[57] ABSTRACT

A porous isopermeable tubular inertial filter with a large pore size has a slurry of fine particles flowed through it while an effluent is withdrawn through a jacket disposed about it until a thin inner layer of pores become clogged by the fine particles. The filter is then dried and the fine particles sintered in place to provide an inertial tubular filter with a upstream inner surface having a thin layer providing a high degree of filtration supported by the larger pore tubular filter.

1 Claim, 5 Drawing Figures

METHOD OF MANUFACTURE OF TUBULAR INERTIAL FILTER

BACKGROUND OF THE INVENTION (1) Field of the Invention

This invention relates to porous filter elements.

(2) Description of the Prior Art

Porous filters requiring periodic blowback pulses to clear them have declining flow rates as the blowback pulses must penetrate the thickness of the entire filter wall to dislodge particles in the upstream filter surface pores.

SUMMARY OF THE INVENTION

A porous filter has a thick iso-permeable wall with a relatively large pore size and an upstream surface. The pores of the upstream surface have a thin layer of finer particles sintered or heat bonded within them to effectively form a thin membrane with a higher degree of filtration than the filter wall. The filter may be a porous stainless steel tube through which a slurry is passed as an effluent is withdrawn through the tube wall.

The filter is fabricated by the method of flowing a slurry containing fine heat bondable or sinterable particles through a porous filter with a larger pore size that the finer particles in the slurry. When effluent flow is reduced indicating pores are being plugged by particles in the slurry, the filter is removed from the slurry, dried, and heated to sinter and bond the smaller particles in the pores of the upstream surface.

In the inertial filtration of liquid slurrys and in the inertial filtration of gas streams containing particulate matter, the filter of this invention greatly increases filter life before plugging and it makes the blowback clearing of a filter much more effective.

DESCRIPTION OF THE PREFERRED EMBODIMENT

Figure 2:
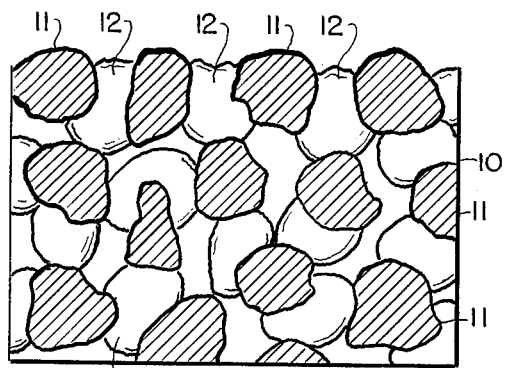
FIG. 2 is a view similar to that of FIG. 1 showing a fragment of a porous filter prior to its being treated by the method of this invention.

As shown in FIG. 2, a porous metal filter 10 has particles 11 of stainless steel compacted to a desired degree and sintered to bond the particles 11 together in the well known manner. Interconnecting pores 12 provide a fluid path through the filter material 10.

Figure 5:
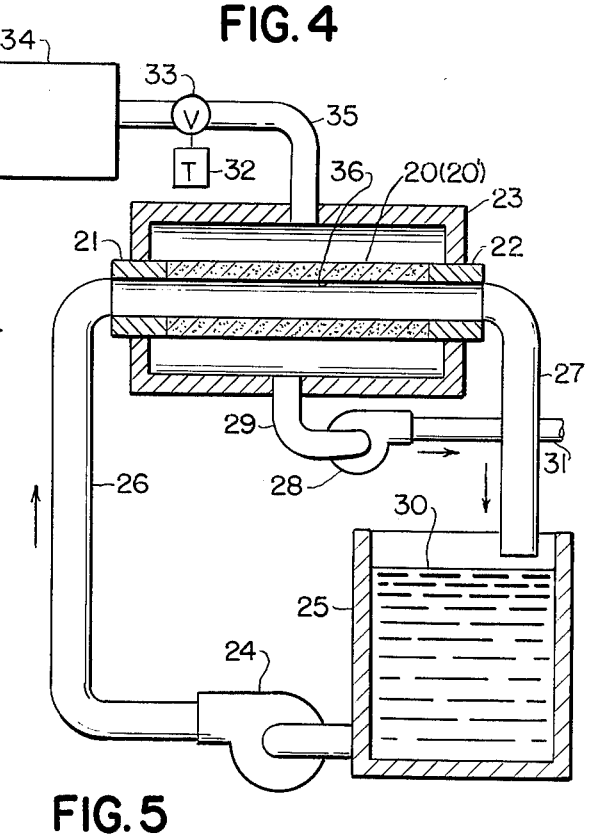
FIG. 5 is a longitudinal section through a filter tube and a surrounding jacket and a side view, with a tank shown in section, of apparatus using the filter of this invention.

FIG. 5 shows a porous metal tubular filter 20 with ends 21 and 22 welded thereto and fixed in jacket 23. A pump 24 draws fluid 30 from tank 25 and passes it through pipe 26 and tubular filter 20 from which pipe 27 returns fluid 30 to the tank 25. A pump 28 withdraws a filtered effluent through pipe 29 and discharges the effluent from the system through pipe 31. If fluid 30 is a slurry of particulate matter such as lead oxide in the production of paint pigment, this apparatus will concentrate it.

As the apparatus is operated the filter pores 12 will become clogged and the rate of effluent withdrawal will drop. A timer 32 can periodically open a valve 33 to allow a short pulse of effluent under pressure in tank 34 to enter jacket 23 through pipe 35 and blow back through tubular filter 20 to dislodge caked material clogging the pores 12 of the upstream of inner surface 36 of filter 20. Each time this blowback is carried out, it is less effective in returning the effluent withdrawal to its original volume as some particles are not dislodged from the pores 12 or they work deeper into the filter material and can't be dislodged.

Figure 3:
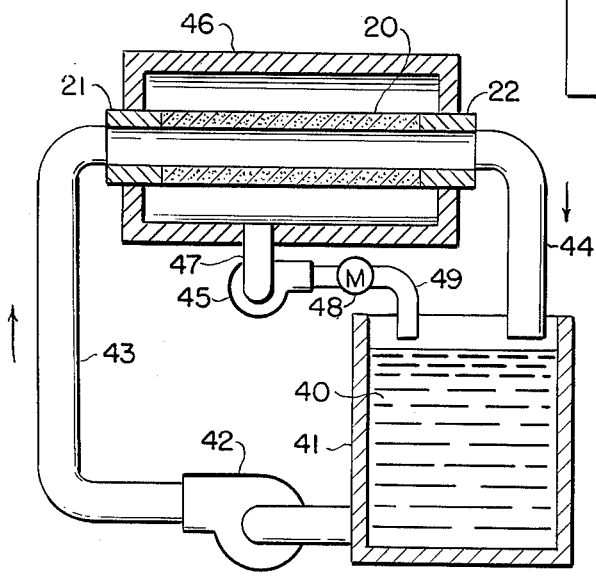
FIG. 3 is a longitudinal section through a porous metal filter tube and a surrounding jacket and a side view, with a tank shown in section, of apparatus treating the filter tube according to a step in the method of this invention to provide the filter of this invention.

Referring now to FIG. 3, the method of preparing a filter according to this invention first involves providing a filter tube 20 of a lower degree of filtration that has larger pores 12 as shown in FIG. 2. If a stainless steel filter tube 20 will pass 2.0 micron particles, a slurry 40 containing 0.5 micron nickel particles in water is prepared and placed in tank 41. Pump 42 circulates the slurry through pipe 43, filter 20, and pipe 44 back to tank 41. Pump 45 draws water as an effluent from jacket 46 through pipe 47 and passes the effluent through a meter 48 and pipe 49 back to tank 41.

Figure 4:
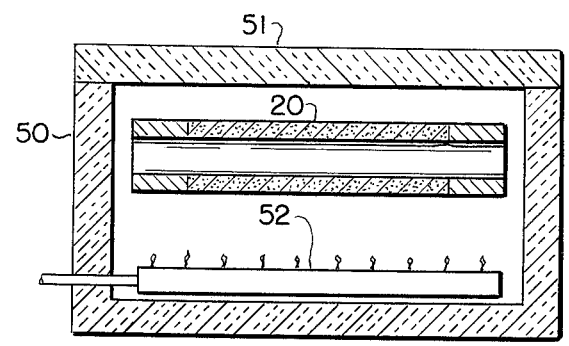
FIG. 4 is a section through a sintering oven and a filter tube therein showing a further step in the method of this invention.

When flow meter 48 indicates that nickel particles are plugging the pores 12 reducing the flow rate of effluent through the filter 20, filter 20 is removed from the apparatus showin in FIG. 3 and placed in the sintering oven 50 shown in FIG. 4. Oven 50 has a lid 51 and contains a heating element 52. Water is dried from the filter tube and its temperature is raised to sinter the nickel particles embedded in its pores in place.

Figure 1:
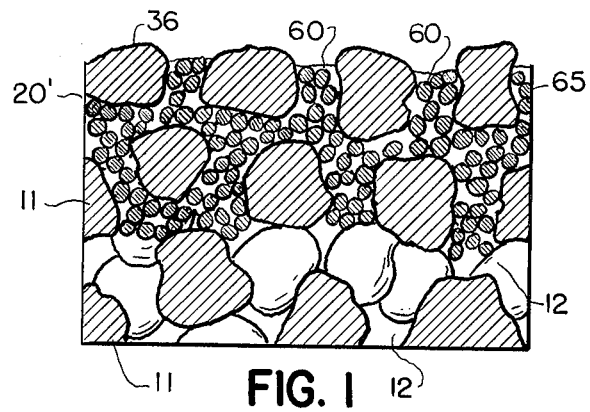
FIG. 1 is a greatly enlarged pictorial representation of a microscopic section taken through a fragment of the upstream surface of a porous filter according to this invention.

As shown in FIG. 1, the nickel particles 60 only penetrate the upstream surface 36 a very slight distance. When the particles 60 are sintered in place, the filter 20' of this invention is provided. If filter 20' is used in the apparatus of FIG. 5, it will function for a very long period of time without clogging as cloggable pores 12 are filled with a porous layer 65 of fine sintered particles. If it eventually becomes clogged, a blowback pulse from tank 34 will more easily and completely clear it because the pressure of the pulse easily passes through the large pores 12 to reach the fine thin layer 65 of sintered particles 60. The filter 20' can't be clogged by fines as any particle passing the layer 61 will easily pass through the larger pores 12 to exit filter 20'. Further, upstream filter surface 36 has its pores 12 filled with sintered fines 60 so that irregularities are reduced and surface caking is rendered less likely. Thus the result of this invention is to provide a thin and very strong upstream surface filtering membrane within the pores of a porous filter.

As one example of this invention stainless steel iso-permeable tubes 20 were made with 0.953 cm. O.D. and 0.635 cm. I.D. having a bubble point in isopropyl alchol of 7.6 to 8.9 cm. of mercury. Used as inertial filters 20 with the apparatus shown in FIG. 5, these tubes were able to function as effective 0.5 microm filters with a flow rate through the tube 20 of 30.48 cc. per sq. cm. of upstream filter surface per minute. With different slurries being filtered, effluent flow dropped with time. With on carbon particle slurry in water, effluent flow dropped from 11.36 liters per 0.0929 sq. m. of upstream filter surface per minute to 0.189 liters per 0.0929 sq. m. per minute with a progressively less effective blowback pulse series applied every 20 minutes.

An identical tube 20 was placed in the apparatus shown in FIG. 3 with a 1% by weight water slurry of nickel having 0.5 micron particles in tank 41. The apparatus was operated until the effluent flow rate dropped from almost 11 liters per 0.0929 sq. m. per minute to 0.189 liters per 0.0929 sq. m. The tube 20 was then removed and sintered to bond the nickel particles in place and the resulting tubular filter 20' was placed in service in the apparatus shown in FIG. 5. Its initial effluent flow rate was about 3.5 liters per 0.0929 sq. m. per minute in a carbon slurry and it remained unplugged before requiring blowback much longer than the conventional tube 20. Blowback was much more effective and filter tube life was extended over ten times.

Further experiments show that the slurry of nickel or other material to the sintered in place need not be of uniform particle size. If the slurry 40 contains some fines of the desired small particle size only the small particles will block pores 12 to provide the thin layer 65 at upstream surface 36. While a stainless steel porous filter 20 with a sintered in place nickel layer 65 has been described, the filter 20' of this invention may be fabricated from a filter 20 of any material with suitable particles heat bonded within it. With a stainless steel filter 20, stainless steel particles, particles of other metals, or plastic particles may be heat bonded within its pores.

I claim:
1. The method of manufacturing a tubular inertial filter comprising the steps of:
 (a) providing a porous iso-permeable filter containing interconnecting pores, said filter being tubular and having an upstream inner surface;
 (b) flowing a slurry containing at least some fine particles smaller than said pores through the tubular filter and withdrawing an effluent from a jacket disposed about said tubular filter filtering some of the slurry into the upstream surface of the filter until a layer of pores adjacent to the upstream surface is clogged by fine particles; and
 (c) removing and heating the filter thereby heat bonding the fine particles within the pores adjacent to the upstream surface to provide a thin layer with a higher degree of filtration.

* * * * *